Feb. 25, 1969         R. C. BUELER         3,429,621
CONTROL VALVE
Filed Dec. 30, 1966

INVENTOR
RICHARD C. BUELER
BY
Joseph E. Papin

United States Patent Office 3,429,621
Patented Feb. 25, 1969

---

3,429,621
CONTROL VALVE
Richard C. Bueler, St. Louis, Mo., assignor to Wagner Electric Corporation, Newark, N.J., a corporation of Delaware
Filed Dec. 30, 1966, Ser. No. 606,155
U.S. Cl. 303—71    9 Claims
Int. Cl. B60t *13/22, 15/02, 17/02*

ABSTRACT OF THE DISCLOSURE

A control valve for normally effecting the application of fluid pressure supplied thereto to the emergency chamber of a spring set brake cylinder and also responsive to a control fluid pressure metered thereto for isolating the supplied fluid pressure and effecting a metered reduction of the applied fluid pressure.

---

Figure 2:
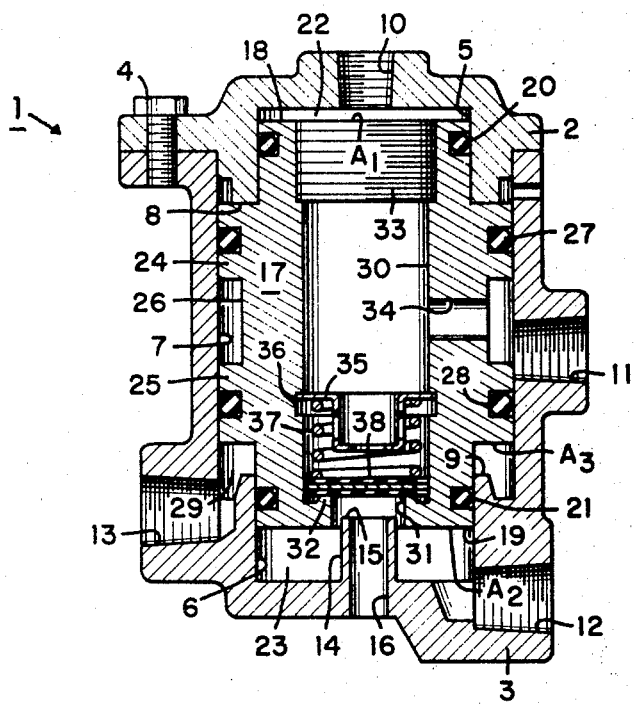

This invention relates to control valves for spring set brake systems and in particular to those control valves for effecting emergency energization of said spring set brake systems.

In the past spring set brake systems for a vehicle or the like, an application valve was operable to selectively apply service fluid pressure from a source thereof to a spring set brake cylinder to actuate a fluid pressure responsive service member thereof which, in turn, energized a brake device operatively connected with said spring set brake cylinder. The spring set brake cylinder was also provided with an emergency or resiliently urged member responsive to emergency fluid pressure less than a predetermined value supplied thereto from another or an emergency fluid pressure source to drivingly actuate and mechanically effect emergency energization of the brake device. In order to manually actuate the emergency member, a push-pull valve of a type well known to the art was provided in the vehicle for operator actuation and manually movable between a charging position for supplying emergency fluid pressure to the resiliently urged member and another exhaust position for venting or dumping the fluid pressure supplied to said resiliently urged member to the atmosphere, thereby also mechanically effecting emergency energization of the brake dvice. One of the disadvantageous or undesirable features of such past spring set brake systems was the lack of control over the emergency energization of the brake device. In other words, the extent of intensity of the emergency energization of the brake device depended upon the extent of the depletion of the emergency fluid pressure below the predetermined value. For instance, if the emergency fluid pressure was depleted down to the predetermined value due to slow leaks or the like in the system, the emergency energization of the brake device was rather gradual and of rather light intensity on the order of brake drag conditions; however, if the emergency fluid pressure was completely depleted due to a conduit rupture or the like, the emergency energization of the brake device was immediate and very intense. In the event of the aforementioned gradual reduction of the emergency fluid pressure and the accompanying rather light emergency energization of the brake device, it was often the case that the operator was unaware of such drag condition or light emergency energization of said brake device and continued to operate his vehicle under the assumption that full tank pressure was available for normal service braking. Further, in the event of the aforementioned complete dissipation of the emergency fluid pressure along with the accompanying immediate and very intense emergency energization of the brake device, the operator's control over the vehicle was greatly impaired, and in some instances, such as when operating the vehicle on slippery or undesirable roadways, such immediate and very intense emergency energization of the brake device might ovbiate the operator's control over the vehicle. In addition to the above, another disadvantageous or undesirable feature of such past spring set brake systems was the lack of ability for the operator to effect a manually controlled or metered dissipation of the emergency fluid pressure to provide controlled emergency or mechanical energization of the brake device. In other words, operator actuation of the aforementioned push-pull valve dumped the fluid pressure supplied to the resiliently urged member to atmosphere, thereby effecting an immediate and very intense mechanical energization of the brake device. Of course, such immediate and intense energization of the brake device also greatly affected the control of the operator over the vehicle and in some instances, such as on slippery or undesirable road conditions, might also completely obviate the operator's control over the vehicle. And yet another disadvantageous or undesirable feature of such past fluid pressure systems was that the push-pull valve was necessarily located in the vehicle adjacent to the driver; therefore, the fluid pressure exhausted from the resiliently urged member to effect emergency energization of the brake device necessarily travelled from the spring set brake cylinder located adjacent to the brake back of the push-pull valve located near the operator, and this flow of the exhausted fluid pressure effected an unnecessary time delay in brake device energization under emergency conditions.

The principal object of the present invention is to provide a novel control valve for use in a spring set brake system which obviates the aforementioned undesirable and disadvantageous features, and this and other objects and advantageous features for the present invention will become apparent hereinafter.

Briefly, the invention embodies a control valve having a flow passage therethrough, application means for controlling the application through said flow passage of fluid pressure supplied thereto, an area on said application means separate from said flow passage for subjection to the supplied fluid pressure, said application means being movable to effect the application of the supplied fluid pressure through said flow passage upon the subjection of said area to the supplied fluid pressure, another area in said flow passage and responsive to the applied fluid pressure opposed to said first named area, and a control area on said application means responsive to metered fluid pressure subjected thereto for moving said application means to effect a metered reduction of the applied fluid pressure.

Figure 1:
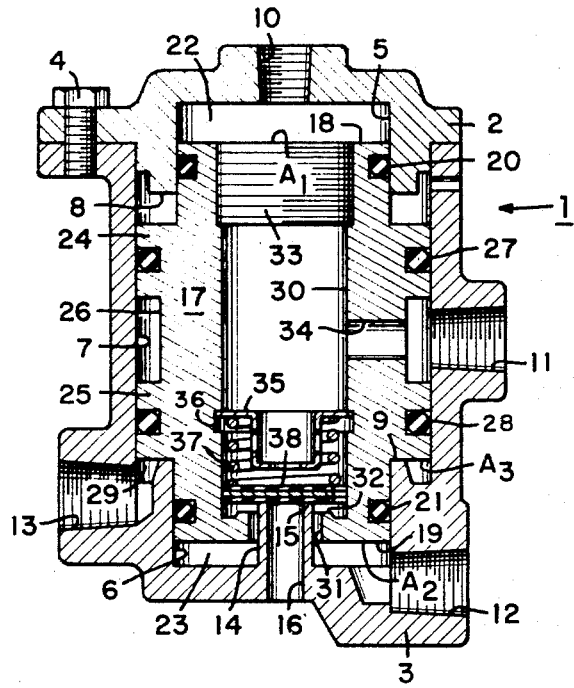

In the drawings, wherein like numerals refer to like parts wherever they occur,

FIG. 1 is a sectional view showing a control valve embodying the present invention in cross-section, and FIG. 2 is another sectional view showing the control valve of FIG. 1 in an applied position in cross-section.

Referring now to the drawings indetail, a control or inversion valve 1 is provided with upper and lower housings 2, 3 interconnected against displacement by suitable means, such as a plurality of studs 4. The upper housing 2 is provided with a bore 5 in axial alignment with a bore and counterbore 6, 7 provided in the lower housing 3, and annular shoulders 8, 9 are provided on said upper and lower housings at the juncture of said counterbore with said bores, respectively. A control or application port 10 is provided in the upper housing 2 intersecting the end wall of the bore 5, said control port being connected with a push-pull valve (not shown) of a type well known in the art and selectively movable between a charging position for subjecting said control port to a fluid pressure source and a venting position for exhausting said control port to the atmosphere. An inlet port 11 is provided in the lower housing 3 intersecting the counterbore 7 adjacent to the mid-portion thereof, said inlet port being supplied at all times with the fluid pressure of the aforementioned source (not shown), and said lower housing is also provided with an outlet port 12 for connection with the emergency chamber of a spring set brake cylinder, such as that disclosed in United States Patent No. 3,152,-521 issued Oct. 13, 1964 to Oliver B. Cruse, and intersecting the bore 6 adjacent to the lower end thereof. Another control port 13 is provided in the lower housing 3 intersecting the counterbore 7 adjacent to the housing shoulder 9, said control port being adapted to receive a control fluid pressure metered thereto from an application valve, or the like (not shown). A hub or stem portion 14 is integrally formed on the end wall of the bore 6 and extends coaxially thereinto having a free end portion defining an exhaust valve seat 15, and an exhaust passage or port 16 extends coaxially through said stem portion and exhaust valve seat to communicate the outlet port 12 with the atmosphere.

An application or piston member, indicated generally at 17, is provided with upper and lower ends 18, 19 slidable in the housing bores 5, 6 and carrying peripheral seals 20, 21 for sealing engagement with said housing bores, said upper and lower ends having opposed, substantially equal, effective areas $A_1$, $A_2$. The piston upper end 18 defines an expansible fluid pressure control or application chamber 22 in the housing bore 5 in open pressure fluid communication with the control port 10, and the piston lower end 19 defines an expansible outlet chamber 23 in the housing bore 6 in open pressure fluid communication with the outlet port 12. Spaced peripheral flanges 24, 25 are also provided in the piston 17 intermediate the upper and lower ends 18, 19 thereof in sliding engagement with the housing counterbore 7 on opposite sides of the inlet port 11, and a peripheral groove 26 is defined in said piston between said flanges in open pressure fluid communication with the inlet port 11 at all times, said flanges carrying peripheral seals 27, 28 in sealing engagement with said housing counterbore, respectively. Another expansible control chamber 29 is defined in the housing counterbore 7 between the housing shoulder 9 and the piston flange 25 in open pressure fluid communication with the control port 13, and an annular effective area $A_3$ is provided on said flange for selective subjection to metered fluid pressure in said control chamber, said area $A_3$ being opposed to the area $A_1$ and additive to the area $A_2$. A pair of stepped connecting passages 30, 31 are axially provided in the piston 17 defining an annular valve seat 32 at the juncture thereof on said piston, and the lower end of the smaller stepped passage 31 intersects with the piston lower end 19 while the upper end of the larger stepped passage 30 is closed by a closure or plug member 33 threadedly received therein. A cross-passage 34 is also provided in the piston 17 connecting the peripheral groove 26 with the larger stepped passage 30. A split type spring retainer 35 is positioned against displacement in an undercut groove or recess 36 provided in the larger stepped passage 30, and a valve spring 37 is biased between said retainer and a valve element 38 urging said valve element into sealing engagement with the valve seat 32 to interrupt pressure fluid communication between the inlet and outlet ports 11, 12.

In the operation, when the control and inlet ports 10, 11 are subjected to supplied fluid pressure from a source, said supplied fluid pressure acts on the area $A_1$ of the piston upper end 18 to create an applied or control force $Fa$ urging the piston 17 downwardly toward its applied position, as shown in FIG. 2. The downward movement of the piston 17 in response to the applied force $Fa$ initially sealably engages the valve element 38 with the exhaust valve seat 15 to close the exhaust passage 16 and interrupt communication between the outlet port 12 and the atmosphere, and further downward movement of said piston thereafter disengages the piston valve seat 32 from said valve element to establish pressure fluid communication between the inlet and outlet ports 11, 12. The supplied fluid pressure flows from the inlet port 11 through the piston peripheral groove 26, cross-passage 34 and stepped passages 30, 31 into the outlet chamber 23 and therefrom to the outlet port 12. The established fluid pressure at the outlet port 12 acts on the effective area $A_2$ to establish an output force $Fo$ in opposition to the applied force $Fa$. Since the opposed areas $A_1$, $A_2$ are substantially equal and since the established fluid pressure at the outlet port 12 is substantially equal to the supplied fluid pressure at the control and inlet ports 10, 11, as previously mentioned, the magnitudes of the applied and output forces $Fa$, $Fo$ are also opposed and substantially equal. Of course, it is obvious that the downward movement of the piston 17 engages the piston flange 25 with the housing shoulder 9 to limit said downward movement and define the applied position of said piston before the established fluid pressure at the outlet port 12 can build up to its maximum magnitude, i.e., substantially equal to the magnitude of the supplied fluid pressure at the inlet port 11; therefore, since the applied and output forces $Fa$, $Fo$ are defined as substantially equal, said piston will remain in its applied position effecting open pressure fluid communication between the inlet and outlet ports 11, 12.

In the event it is desirable to effect a metered reduction of the established fluid pressure at the outlet port 12, control fluid pressure is selectively metered to the control port and chamber 13, 29 acting on the control area $A_3$ of the piston 17 to establish a control force $Fc$ in opposition to the applied force $Fa$ and additive to the output force $Fo$. Since the applied and output forces $Fa$, $Fo$ are substantially balanced, the control force $Fc$ is effective to move the piston 17 upwardly in a metering direction to initially sealably re-engage the piston valve seal 32 with the valve element 38 and thereafter move said valve element toward a position disengaged from the exhaust valve seat 15. In this manner, pressure fluid communication between the inlet and outlet ports 11, 12 is again interrupted isolating the supplied fluid pressure at said inlet port from the established fluid pressure at said outlet port, and pressure fluid communication between said outlet and exhaust ports 12, 16 is re-established to meter the established fluid pressure to the atmosphere. Of course, the metered reduction of the established fluid pressure at the outlet port 12 effects a corresponding reduction of the output force $Fo$; therefore, when the magnitude of the reduced output force $Fo$ and the additive control force $Fc$ become substantially equal to the magnitude of the applied force $Fa$, the piston 17 moves downwardly toward a lapsed position wherein the valve element 38 is in lapped engagement with the piston valve seat 32 and the exhaust valve seat 15. In the event a more intense metered reduction of the established fluid pressure at the outlet port 12 is desired, the magnitude of the control fluid pressure metered to the control port and chamber 13, 29 is increased thereby increasing the control force $Fc$, and the piston 17 reacts to the increased control force $Fc$ to further effect metered dissipation of the established fluid pressure at said output port, as previously described.

When it is desirable to re-establish the magnitude of the established fluid pressure at the outlet port 12, the metered control fluid pressure at the control port 13 is exhausted thereby eliminating the control force $Fc$. Upon the elimination of the control force $Fc$, the magnitude of the applied force $Fa$ is greater than that of the reduced output force $Fo$; therefore, the differential between the applied and reduced output forces $Fa$, $Fo$ is effective to move the piston 17 downwardly toward its applied position in engagement with the housing shoulder 9 to again disengage the piston valve seat 32 from the valve element 38 and re-establish open pressure fluid communication between the inlet and outlet ports 11, 12. In this manner, the established fluid pressure at the outlet port 12 again becomes substantially equal to the supplied fluid pressure at the control and inlet ports 10, 11, and the applied and output forces $Fa$, $Fo$ are once again substantially balanced.

The control valve 1 can be "dynamited" by exhausting the supplied fluid pressure at the control port 10 thereby eliminating the applied force Fa, and the output force Fo is thereafter effective to move the piston 17 upwardly into abutting engagement with the housing shoulder 8 wherein the valve element 38 is disengaged from the exhaust valve seat 15. In this manner, pressure fluid communication is established between the outlet and exhaust ports 12, 16 to dump the established fluid pressure to the atmosphere thereby eliminating the output force Fo, as opposed to the above-described metered reduction of the established fluid pressure at said outlet port.

The embodiments of the invention in which an exclusive property or privileges is claimed are defined as follows:

1. A control valve comprising a housing, valve control means movable in said housing and having opposed ends defining with said housing opposed control and outlet chambers, respectively, said valve control means also defining with said housing an inlet chamber between said opposed ends separate from said control chamber and said inlet and control chambers being subjected to substantially the same fluid pressure, passage means in said valve control means and extending through only one of said opposed ends between said inlet and outlet chambers, a valve seat on said valve control means in circumscribing relation with said passage means, valve means in said valve control means urged into engagement with said valve seat closing said passage means and interrupting pressure fluid communication between said inlet and outlet chambers, an exhaust valve seat in said outlet chamber for engagement with said valve means, said valve control means being initially movable in response to fluid pressure in said control chamber acting on the other of said opposed ends to engage said valve means with said exhaust valve seat and being thereafter further movable relative to said valve means to disengage said first named valve seat from said valve means opening said passage means and establishing pressure fluid communication between said inlet and outlet chambers, the established fluid pressure in said outlet chamber acting on said one opposed end to oppose further movement of said valve control means, an intermediate portion on said valve control means in opposed relation to said other opposed end and defining with said housing another control chamber for selective subjection to metered fluid pressure, said valve control means being movable in response to metered fluid pressure in said control chamber acting on said intermediate portion to re-engage said first named valve seat with said valve means interrupting pressure fluid communication between said inlet and outlet chambers and thereafter disengage said valve means from said exhaust valve seat to meter the established fluid pressure in said outlet chamber to the atmosphere to reduce the magnitude thereof in a ratio proportional with that of the metered fluid pressure in said other control chamber when said other control chamber is subjected to the metered fluid pressure.

2. A control valve comprising a housing having a counterbore connected between a pair of opposed bores, an inlet port in said housing for subjection to fluid pressure supplied thereto and intersecting with said counterbore, a control port in said housing for subjection to the fluid pressure supplied to said inlet port and connected with one of said bores, an outlet port in said housing connected with the other of said bores, piston means having opposed end portions respectively slidable in said bores, one of said opposed end portions having an effective area for subjection to supplied fluid pressure at said control port and the other of said opposed end portions having another effective area opposed and substantially equal to said first named effective area for subjection to established fluid pressure at said outlet port, a pair of opposed spaced peripheral flange means on said piston means between the opposed ends thereof slidable in said counterbore, peripheral groove means in said piston means between said flange means and connected in open pressure fluid communication with said inlet port at all times, a valve chamber in said piston means connected between said groove means and said other opposed end portion, a valve seat on said piston means in circumscribing relation with said valve chamber, valve means in said piston means and urged into engagement with said valve seat interrupting pressure fluid communication between said inlet and outlet ports, an exhaust stem extending into said other bore and having an exhaust valve seat on the free end thereof, an exhaust passage extending through said stem and exhaust valve seat communicating said outlet port with the atmosphere, said piston means being movable toward an applied position in said housing in response to supplied fluid pressure at said control port acting on said first named area to initially engage said valve means with said exhaust valve seat closing said exhaust passage and interrupting communication between said outlet port and the atmosphere and thereafter further movable relative to said valve means to disengage said first named valve seat therefrom and establish pressure fluid communication between said inlet and outlet ports, the established fluid pressure at said outlet port acting on said other area to oppose further movement of said piston means, a shoulder on said housing at the juncture of said counterbore with said other bore and defining the applied position of said piston means, one of said flange means being moved into abutment with said shoulder when said piston means is in its applied position, another control port in said housing for selective subjection to metered control fluid pressure and intersecting with said counterbore adjacent to said shoulder, and a third effective area on said one flange means additive to said other area and responsive to metered control fluid pressure at said other control port, said piston means being movable from the applied position thereof toward a metering position in response to metered fluid pressure at said other control port acting on said third area to initially re-engage said first named valve seat with said valve means interrupting pressure fluid communication between said inlet and outlet ports and thereafter disengage said valve means from said exhaust valve seat-re-establishing communication between said outlet port and the atmosphere to effect a metered reduction of the magnitude of the established fluid pressure in a ratio proportional with that of the metered control fluid pressure at said other control port when said other control port is subjected to metered control fluid pressure.

3. A control valve comprising a housing having an inlet port, an outlet port, and a pair of control ports therein, a valve control member movable in said housing and having opposed end portions for respective subjection to fluid pressure at said outlet port and one of said control ports, passage means in said valve control member extending through only one of said end portions and connected between said inlet and outlet ports, valve means in said valve control member and movable in said passage means for controlling pressure fluid communication between said inlet and outlet ports, said valve control member being movable in response to fluid pressure at said one control port acting on the other of said end portions to move said valve means toward a position in said passage means establishing pressure fluid communication between said inlet and outlet ports and the established fluid pressure at said outlet port acting on said one end portion to oppose the valve control member movement, and other means on said valve control member for subjection to fluid pressure selectively metered to the other of said control ports, said valve control member being movable against the fluid pressure at said one control port acting on said other end portion in response to the metered fluid pressure at said other control port acting on said other means and the established fluid pressure at said outlet port acting on said one end portion to move said valve means toward another position in said passage means interrupting pressure fluid communication between said inlet and outlet ports and metering the established fluid pressure at said outlet port to the atmosphere to reduce the magnitude thereof in a ratio proportional with that of the metered fluid pressure at said other control port upon the subjection of said other control port to the metered fluid pressure.

4. The control valve according to claim 3 wherein said one and other end portions define one and other opposed substantially equal effective areas subjected to the established fluid pressure at said outlet port and the fluid pressure at said one control port, respectively, and said other means including a third area additive to said one area and subjected to the metered fluid pressure at said other control port.

5. The control valve according to claim 3, comprising a valve seat on said valve control member about said passage means, said valve means being urged into engagement with said valve seat to interrupt pressure fluid communication between said inlet and outlet ports, means in said housing defining an exhaust passage for venting said outlet port to the atmosphere including another valve seat about said exhaust passage, said valve control member being movable in response to fluid pressure at said one control port acting on said other end portion to initially engage said valve means with said other valve seat closing said exhaust passage and thereafter disengaging said first named valve seat from said valve means to open said passage means and establish pressure fluid communication between said inlet and outlet ports, and said valve control member also being responsive to the metered fluid pressure at said other control port to re-engage said first named valve seat with said valve means and thereafter disengage said valve means from said other valve seat to meter the established fluid pressure at said outlet port to the atmosphere through said exhaust passage.

6. The control valve according to claim 3, comprising abutment means on said housing and engageable with said other means to limit the movement of said valve control member in response to the fluid pressure at said one control port acting on said other end portion.

7. The control valve according to claim 3, comprising flange means on said valve control member spaced from said other end portion and movable in said housing between said one control port and said inlet port, said other means including other flange means spaced from said one end portion and movable in said housing between said other control port and said outlet port, and peripheral groove means in said valve control member between said first named and other flange means in pressure fluid communication with said inlet port at all times and defining a portion of said passage means.

8. The control valve according to claim 7, comprising a first area on said other end portion for subjection to the fluid pressure at said one control port, a second area on said one end portion opposed to and substantially equal to said first area for subjection to the established fluid pressure at said outlet port, a third area on said other flange means additive to said second area for subjection to the metered fluid pressure at said other control port, a valve seat on said valve control member about said passage means, said valve means being normally urged into engagement with said valve seat closing said passage means, an exhaust passage in said housing normally communicating said outlet port with the atmosphere, another valve seat about said exhaust passage for engagement with said valve means, said valve control member being movable in one direction in response to fluid pressure at said one control port acting on said first area to initially engage said valve means with said other valve seat closing said exhaust passage and said valve control member being thereafter further movable relative to said valve means to move said first named valve seat toward a position disengaged from said valve means opening said passage means, and abutment means on said housing and engageable with said other flange means to limit the movement of said valve control member in the one direction, said valve control member also being movable in a direction opposite to the one direction in response to the established fluid pressure at said outlet port acting on said second area and the metered fluid pressure at said other control port acting on said third area to initially re-engage said other valve seat with said valve means closing said passage means and thereafter move said valve means toward a metering position disengaged from said other valve seat to meter the established fluid pressure at said outlet port to the atmosphere through said exhaust passage and effect the reduction of the magnitude thereof in the ratio proportional with the magnitude of the metered fluid pressure at said other control port.

9. The control valve according to claim 3, comprising a counterbore in said housing connected between a pair of opposed bores, said one end portion being slidable in one of said bores and defining therewith an outlet chamber connected in pressure fluid communication with said outlet port, said other end portion being slidable in the other of said bores and defining therewith a control chamber connected in pressure fluid communication with said first named control port, said other means including a radially extending flange slidable in said counterbore and defining therewith another control chamber connected in pressure fluid communication with said other control port, another radially extending flange on said valve control member slidable in said counterbore and spaced from said first named flange, peripheral groove means in said valve control member between said first named and other flanges defining an inlet chamber connected in pressure fluid communication with said inlet port at all times, said passage means being connected between said inlet and outlet chambers, a valve seat on said valve control member about said passage means, said valve means being normally urged into engagement with said valve seat to close said passage means and interrupt pressure fluid communication between said inlet and outlet chambers, means in said housing defining an exhaust passage normally venting said outlet chamber to the atmosphere including another valve seat about said exhaust passage, said valve control member being movable in response to fluid pressure in said first named chamber acting on said other end portion to engage said valve means with said other valve seat closing said exhaust passage and thereafter disengages said first named valve seat from said valve means to open said passage means and establish pressure fluid communication between said inlet and outlet chambers, and said valve control member also being responsive to metered fluid pressure in said other control chamber to re-engage said first named valve seat with said valve means closing said passage means and thereafter disengage said valve means from said other valve seat to meter the established fluid pressure in said outlet chamber to the atmosphere through said exhaust passage.

References Cited

UNITED STATES PATENTS 3,188,916  6/1965  Beatty.
3,272,567  9/1966  Vielmo _____ 303—40 X MILTON BUCHLER, *Primary Examiner.*

JOHN J. McLAUGHLIN, JR., *Assistant Examiner.*

U.S. Cl. X.R.

137—627.5; 303—13, 40